3,778,382
HYDROPEROXIDE TREATMENT
Richard Bruce Poenisch, League City, and Fernando Francis Birch, La Porte, Tex., assignors to Oxirane Corporation
No Drawing. Filed Nov. 3, 1970, Ser. No. 86,612
Int. Cl. B01d 3/34; C23f 11/00
U.S. Cl. 252—326
11 Claims

ABSTRACT OF THE DISCLOSURE

Aqueous tertiary butyl hydroperoxide compositions are treated with a neutral salt or an organic acid to permit sharp and rapid phase separation.

---

This invention relates to aqueous compositions containing tertiary butyl hydroperoxide and is more particularly concerned with means for effecting improved separation of the aqueous and the organic phases of such compositions.

Tertiary butyl hydroperoxide is a well-known commercial chemical which is useful for various purposes, e.g. as a catalyst or initiator in the free radical polymerization of vinyl monomers, and can be produced by the liquid phase oxidation of isobutane. A typical process of this type for preparing tertiary butyl hydroperoxide is described in Winkler et al. U.S. Pat. 2,845,461. The tertiary butyl hydroperoxide prepared in this manner is admixed with tertiary butyl alcohol, which is produced as a byproduct of the oxidation reaction, along with various other oxidation products such as formic acid and its esters. The tertiary butyl hydroperoxide can be separated from these by-products by fractional distillation and particularly effective fractional distillation procedures are described in French Pat. 1,587,190, wherein the distillation is effected in the presence of a diluent vapor. In order to suppress decomposition of the tertiary butyl hydroperoxide when subjected to distillation procedures of this type, and thereby to make possible the recovery of a product of increased purity, it is desirable to effect at least partial neutralization of the isobutane oxidation mixture before initiating the distillation procedure. Such treatment is described in Harvey U.S. Pat. 3,449,217.

When the operations referred to above are applied, there is first obtained from the reaction product subjected to fractional distillation a distillate composed primarily of tertiary-butanol, followed by a further distillate composed essentially of tertiary butyl hydroperoxide and the diluent vapor. When the diluent vapor is steam, there is obtained upon condensation of the later distillate a mixture of tertiary butyl hydroperoxide and water which tends to separate into an aqueous phase and an organic phase, with the aqueous phase being returned as reflux to the distillation column. However, the phase separation is slow and lacks sharpness and some water remains dispersed in the organic phase for long periods of time. Furthermore, even when tertiary butyl hydroperoxide is produced in the absence of significant amounts of water, it is customary to ship tertiary butyl hydroperoxide in admixture with substantial quantities of water in order to comply with precautionary shipping regulations. However, it is often desired to employ the tertiary butyl hydroperoxide in a substantially less hydrous form but, because of the poor phase-separating characteristics of the water-tertiary butyl hydroperoxide system substantial time must be allowed after shipment or movement of the mixture for the desired phase separation to occur so that the tertiary butyl hydroperoxide can be efficiently decanted away from the aqueous phase. Tertiary butyl hydroperoxide and water are mutually soluble to a limited extent but this mutual solubility varies with temperature, with the solubility of each component of the system in the other generally decreasing with increasing temperature. With appropriate temperature change, therefore, a single-phase system can be converted into a two-phase system, and vice versa. The problems referred to above occur when a mixture of water and tertiary butyl hydroperoxide needs to be handled as a two-phase system.

It is accordingly an object of this invention to provide means for accelerating and improving the phase separation of mixtures of water and tertiary butyl hydroperoxide.

It is a further object of the invention to improve the distillation of tertiary butyl hydroperoxide from isobutane oxidation reaction mixtures in the presence of water vapor.

It is another object of the invention to provide a water-tertiary butyl hydroperoxide mixture which will separate rapidly and sharply into a two-phase system.

In accordance with the invention, the foregoing and other objects are realized by adding to the water-tertiary butyl peroxide system a small but effective amount of an organic acid or of a salt. More particularly the acid is one having a pK in dilute water solution (0.1 N) at 25° C. of at most 3.5 and advantageously has a solubility in water of at least 1% at 25° C. The salt is most suitably a neutral salt and particularly suitable is an alkali metal salt of a mineral acid.

Typical organic acids which may be employed in the practice of the invention include oxalic, citric, fumaric, salicylic, and tartaric acids. Other organic acids meeting the foregoing definition are suitable but generally less desirable are acids having halogen or nitro substituents.

Neutral salts of mineral acids which are suitable to achieve the increased phase separation in a water-tertiary butyl hydroperoxide system are, as mentioned, most suitably the alkali metal salts and typical salts include sodium sulfate, sodium chloride, potassium sulfate and potassium chloride.

The amount of organic acid most suitably used is that amount required to provide a pH of at most 3.75 in the treated mixture and preferably the pH is not lowered below about 3.0. In the case of the neutral salt, at least about 10 p.p.m., preferably 20 to 50 p.p.m., based on the tertiary butyl hydroperoxide to which the salt is added, are employed. It will be understood, however, that the invention is not limited to these particularly specified quantities of acid or salt, although they are preferred for best results, and lesser or greater quantities which are effective to obtain the increased phase separation can be used. In the case of the salt, there generally is no advantage in amounts greater than 200 p.p.m. and in most cases 100 p.p.m. is more than sufficient. While the amount of acid has been expressed above in terms of pH, in actual practice the amounts suitably employed are in the same general range as the amounts of neutral salt specified above. The invention thus contemplates the use of very minor quantities of salt or acid and is to be distinguished from the use of large quantities of certain salts as drying or dehydrating agents.

In practicing this invention the organic acid or the neutral salt are most suitably added to the condensed distillate from the tertiary butyl hydroperoxide distillation. The acid or salt is advantageously added in aqueous solution. Alternatively, the acid or salt can be added to the tertiary butyl hydroperoxide mixture recovered from the distillation operation. In a typical distillation of an isobutane oxidate in the presence of water vapor, distillation is effected in two stages. In the first stage, most of the tertiary butanol is removed as distillate along with some of the water. In the second stage, the water and tertiary butyl hydroperoxide distill overhead and are condensed and undergo a crude phase separation. The lower layer, an aqueous phase generally containing 15–20% tertiary butyl peroxide, is returned to the distillation column as reflux, while the upper phase, generally containing 60 to 70% tertiary butyl hydroperoxide, is removed from the system. The salt or acid can be added to the system to facilitate the first phase separation and, from the standpoint of the distillation operation it is advantageous to do so, or the separated organic phase can be treated in accordance with this invention to provide an aqueous composition which will separate rapidly and sharply into two phases for easy separation when it is desired to use the tertiary butyl hydroperoxide in a substantially less hydrous form.

The following examples will serve to provide a fuller understanding of the invention but it will be understood that these examples are for illustrative purposes only and are not intended to be limitative of the invention.

EXAMPLE I

A mixture containing 50 g. of tertiary butyl hydroperoxide, 50 g. of tertiary butanol and 100 g. of water is charged to a 250 cc. pot under a 15 plate Oldershaw fractionating column topped with a magnetic reflux/ratio head. Analysis indicates that the mixture contains 47.3 g. of tertiary butyl hydroperoxide. The tertiary butyl hydroperoxide and tertiary butanol are not completely miscible with the water. The amount of water added is that necessary to maintain less than 60% tertiary butyl hydroperoxide in the vapor phase at all times during the distillation. The mixture is distilled with cuts being analyzed during the course of the distillation. After removing the initial cuts containing most of the tertiary butyl alcohol and only minor amounts of tertiary butyl hydroperoxide, there are collected four cuts during distillation at a pot temperature gradually increasing from 65° C. to 105° C. and a head temperature of 55 to 100, the cuts being taken at about ¼ hour intervals, using a reflux ratio of 1–½:1 to 2–½:1. As the distillation proceeds, the condensate, which contains about 35 volume percent of tertiary butyl hydroperoxide has added to it 30 p.p.m. of NaCl and the lower of the two phases which separate is returned to the distillation column as reflux, while the upper phase is continuously removed. The thus recovered upper phase has a tertiary butyl hydroperoxide content of approximately 65–70% and when it is allowed to settle, it rapidly separates sharply into an organic phase and into an aqueous phase from which the organic phase can be readily decanted.

When the foregoing example is repeated using corresponding quantities of sodium sulfate or of oxalic acid, similar results are obtained.

EXAMPLE II

A series of three isobutane oxidates from which isobutane has been removed is passed to a suitable fractionating column at a rate of about 1200 lbs. per hour. Each oxidate contains about 650 lbs. of tertiary butanol and about 500 lbs. of tertiary butyl hydroperoxide. Water is injected into each oxidate at a rate of about 6500 lbs. per hour before the oxidate enters the fractionating column and distillation is carried out at atmospheric pressure at a bottom temperature of about 80° C. In each case the distillate from the column is passed to a condenser and part of the condensate is returned to the column as reflux with a reflux ratio of about 2 to 1. This operation is carried out until about 99.9% of the tertiary butanol has been removed. The material remaining in the still, i.e. the "bottoms" which now is composed predominantly of tertiary butyl hydroperoxide and water, is then passed to a second similar fractionating column and distillation is continued at atmospheric pressure at at bottom temperature of about 105° C. The overhead vapors from this column are passed to a condenser and then to a separating tank where bulk phase separation occurs and the lower aqueous phase containing about 16 to 17% tertiary butyl hydroperoxide is returned to the column as reflux in a reflux ratio of about 1½ to 1 while the upper phase, which contains about 65–70% tertiary butyl hydroperoxide, and 30–35% water, is removed. Samples of each of the upper phases from the three distillates are allowed to settle into an organic phase and an aqueous phase at 40° C. and the time required for the phase separation to become sharp and clear is noted. This is characterized as the settling time. The following data apply to these samples:

| Sample | A | B | C |
|---|---|---|---|
| pH | 6.3 | 3.85 | 5.40 |
| Settling time, min | 270 | 180 | 180 |

Sample A is shaken and has added to it 20 p.p.m. of sodium sulfate and its settling time is found to have been reduced to 30 minutes. When an additional 20 p.p.m. of sodium sulfate is added to it, the settling time is reduced to 10 minutes. When 20 p.p.m. of sodium sulfate is added to Sample B, the settling time is reduced to 5 minutes and additional amounts of sodium sulfate do not materially reduce this settling time. When 40 p.p.m. sodium sulfate is added to Sample C, the settling time is reduced to 5 minutes. The effect of sodium chloride is demonstrated by adding this salt to Sample B and 20 p.p.m. is found to reduce the stettling time to 20 minutes.

To another portion of Sample B 40 p.p.m. of oxalic acid is added and the pH is reduced to 3.5. At the same time the settling time is reduced to less than 10 minutes.

Similar results are obtained when the salts are replaced by the corresponding potassium salts and when the oxalic acid is replaced by fumaric acid and tartaric acid.

In like manner, the described phase separation also occurs when the salt or acid is added to the total condensates obtained in the foregoing distillations.

What is claimed is:

1. A process for accelerating and improving phase separation in an aqueous mixture consisting essentially of at least about 30% by weight water and at least about 35% by weight tertiary butyl hydroperoxide which comprises adding to said mixture a small amount effective to accelerate and improve phase separation between said water and said hydroperoxide of an organic acid having a pK in 0.1 N water solution at 25° C. of at most about 3.5 or of a neutral salt of a mineral acid.

2. A process as defined in claim 1, wherein said acid is added in an amount to reduce the pH of said mixture to at most 3.75.

3. A process as defined in claim 1, wherein said acid has a solubility in water of at least about 1% at 25° C.

4. A process as defined in claim 1, wherein said organic acid is selected from the group consisting of oxalic acid, citric acid, fumaric acid, salicylic acid and tartaric acid.

5. A process as defined in claim 1, wherein said neutral salt is selected from the group consisting of sodium sulfate, sodium chloride, potassium sulfate and potassium chloride.

6. An aqueous mixture separable into an organic phase and an aqueous phase consisting essentially of at least about 30% by weight water and at least about 35% by weight tertiary butyl hydroperoxide and containing a small amount of an organic acid having a pK in 0.1 N water solution at 25° C. of at most about 3.5 or of a neutral salt of a mineral acid effective to accelerate and improve the phase separation between said water and said tertiary butyl hydroperoxide, said organic acid being used in an amount to provide a maximum pH of about 3.75 in said composition and said salt being used in the amount of about 10 p.p.m. to about 200 p.p.m. based on the tertiary butyl hydroperoxide.

7. A mixture as defined in claim 6, wherein said salt is an alkali metal salt of a mineral acid.

8. An aqueous mixture as defined in claim 6, wherein said organic acid is selected from the group consisting of oxalic acid, citric acid, fumaric acid, salicylic acid and tartaric acid.

9. An aqueous mixture as defined in claim 6, wherein said neutral salt is selected from the group consisting of sodium sulfate, sodium chloride, potassium sulfate and potassium chloride.

10. An aqueous mixture as defined in claim 6, wherein said organic acid has a solubility in water of at least about 1% at 25° C.

11. A process as defined in claim 1 herein said salt is an alkali metal salt of a mineral acid.

References Cited
FOREIGN PATENTS
800,214   8/1958   Great Britain.

JOHN D. WELSH, Primary Examiner

U.S. Cl. X.R.
203—6; 252—186